United States Patent
Nagano et al.

(10) Patent No.: US 6,225,783 B1
(45) Date of Patent: *May 1, 2001

(54) BATTERY CHARGE CONTROLLED AS FUNCTION OF OPERATING MODE

(75) Inventors: Naoki Nagano, Tokyo; Toshio Koyama, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,949

(22) Filed: Apr. 22, 1999

Related U.S. Application Data

(62) Division of application No. 09/189,923, filed on Nov. 12, 1998, which is a continuation of application No. 09/067,933, filed on Apr. 28, 1998, which is a continuation of application No. 08/827,532, filed on Mar. 28, 1997, now Pat. No. 5,872,444.

(30) Foreign Application Priority Data

Apr. 5, 1996 (JP) .............................................. P08-110212

(51) Int. Cl.⁷ .......................... H01M 10/44; H01M 10/46
(52) U.S. Cl. ............................................................ 320/128
(58) Field of Search ................................... 320/106, 128, 320/165, 152, 161, 162

(56) References Cited

U.S. PATENT DOCUMENTS

| | | | |
|---|---|---|---|
| 3,617,850 | * 11/1971 | Domshy . | |
| 4,387,334 | 6/1983 | Loper . | |
| 4,849,682 | 7/1989 | Bauer et al. . | |
| 5,541,496 | 7/1996 | Simmonds . | |
| 5,633,573 | 5/1997 | van Phuoc et al. . | |
| 6,008,620 | * 12/1999 | Nagano et al. | 320/106 |

* cited by examiner

*Primary Examiner*—Edward H. Tso
(74) *Attorney, Agent, or Firm*—Frommer Lawrence & Haug, LLP.; William S. Frommer

(57) ABSTRACT

There is disclosed a battery charging device for charging a battery pack having a battery cell, the battery pack being capable of storing an information for a maximum charging current and a maximum charging voltage of the battery cell and communicating the information with the battery charging device, which includes a communication means for receiving the information indicative of the maximum charging current and the information indicative of the maximum charging voltage of the battery cell which is transmitted from the battery pack, and a control means for controlling charging current and voltage upon charging so as not to exceed the maximum charging current and the maximum charging voltage of the battery cell. Further, in accordance with the present invention, there are disclosed a method for charging the battery pack, and the battery pack capable of being mounted to various electronic apparatuses.

23 Claims, 6 Drawing Sheets

INITIAL CAPACITY
08H → 8mAh

↓ 1mA CHARGE
(1 HOUR)

CAPACITY AFTER
ONE HOUR
09H → 9mAh

↓ 2mA CHARGE
(1 HOUR)

CAPACITY AFTER
2 HOURS
0BH → 11mAh

⋮

INITIAL CAPACITY
01H → 1mAh

↓ 8mA CHARGE
(1 HOUR)

3 BIT SHIFT
A/D CONVERSION DATA
01 → 08H=8mAh

RESIDUAL
BATTERY CAPACITY
09H → 9mAh

BATTERY CHARGE CONTROLLED AS FUNCTION OF OPERATING MODE

This is a Divisional of prior application Ser. No. 09/189,923, filed Nov. 12, 1998, which is a continuation of prior application Ser. No. 09/067,933, filed Apr. 28, 1998, which is a continuation of application Ser. No. 08/827,532, filed Mar. 28, 1997 U.S. Pat. No. 5,872,444.

BACKGROUND OF THE INVENTION

The present invention relates to a battery pack used as a power source for video cameras, portable telephones or personal computers, a battery charging device for charging the battery pack and a method for charging the battery pack.

Hitherto, there are known battery packs constituted by secondary batteries such as lithium-ion batteries, nickel-cadmium batteries, nickel-hydrogen batteries or the like.

These known battery packs incorporate, for example, a microcomputer for calculating a residual capacity thereof and conducting communications with electronic apparatuses using the battery pack as a power source, peripheral devices, a detection circuit for detecting conditions of a battery cell which are required for the microcomputer to calculate the residual battery capacity, or the like.

In conventional battery charging devices for these battery packs, for example, constituted by lithium-ion batteries, there has been used a constant-voltage charging system in which a predetermined constant voltage is continuously applied when the battery is charged. In addition, the respective battery packs have often been different in charging voltage (which means a maximum charging voltage which can be applied to the battery pack to be charged, and is hereinafter referred to merely as "maximum charging voltage") per one battery cell depending upon kinds of electrodes used in the respective battery cells. For this reason, many of the conventional battery charging devices have been used only for charging limited kinds of battery packs compatible thereto.

However, from the standpoint of costs, it have been inconvenient to prepare many battery charging devices compatible to various types of battery packs. Accordingly, many of recent battery charging devices are obliged to have such a function by which various types of battery packs having different maximum charging voltages can be charged.

However, such battery charging devices capable of charging plural kinds of battery packs have been so designed, from the viewpoint of safety, as to operate in conditions for charging the battery packs having the lowermost maximum charging voltage among those of all the compatible battery packs. Similarly, the battery charging devices have been so designed as to provide such a charging current (which means a maximum charging current which can flow through the battery pack, and is hereinafter referred to merely as "maximum charging current") identical to the lowermost maximum charging current among those of all the compatible battery packs.

Thus, in these conventional battery charging devices, it is impossible to equally supply an optimum charging energy to all the compatible battery packs intended, so that there arise inconveniences that 100% charging cannot be attained or it takes a considerably long time to attain 100% charging.

SUMMARY OF THE INVENTION

The present invention has been achieved in view of the afore-mentioned problems. Accordingly, it is an object of the present invention to provide a battery charging device capable of supplying an optimum charging energy to all of a plurality of battery packs intended and a method for charging the battery pack, and the battery pack which can be charged by such a battery charging device and method.

The battery charging device and method according to the present invention are such device and method for charging the battery pack which can store at least an information indicative of the maximum charging current and an information indicative of the maximum charging voltage and communicate the information. In accordance with the present invention, the afore-mentioned problems can be overcome by receiving the information indicative of the maximum charging current and the information indicative of the maximum charging voltage from the battery pack, detecting a current voltage of the battery pack upon charging, changing over a charging condition of the battery pack between a constant-current charge and a constant-voltage charge depending upon the detected current voltage, and controlling the charging of the battery pack so as not to exceed the maximum charging current and the maximum charging voltage.

In addition, the battery pack according to the present invention comprises a battery cell, a memory means for storing an information indicative of a maximum charging current and an information indicative of a maximum charging voltage of the battery cell and a communication means for transmitting the information indicative of the maximum charging current and the information indicative of the maximum charging voltage, thereby overcoming the afore-mentioned problems.

That is, in accordance with the present invention, it is possible to equally supply an optimum charging energy to all of a plurality of battery packs having different maximum charging currents and maximum charging voltages by storing the information indicative of the maximum charging current and the information indicative of the maximum charging voltage on the battery pack, changing over a charging condition of the battery pack between a constant-current charge and a constant-voltage charge depending upon a current voltage of the battery pack when the battery pack is charged, and further controlling the charging of the battery pack so as not to exceed the maximum charging current and the maximum charging voltage.

DESCRIPTION OF THE PREFERRED EMBODIMENTS

The preferred embodiments of the present invention are described below by referring to the accompanying drawings.

Figure 1:
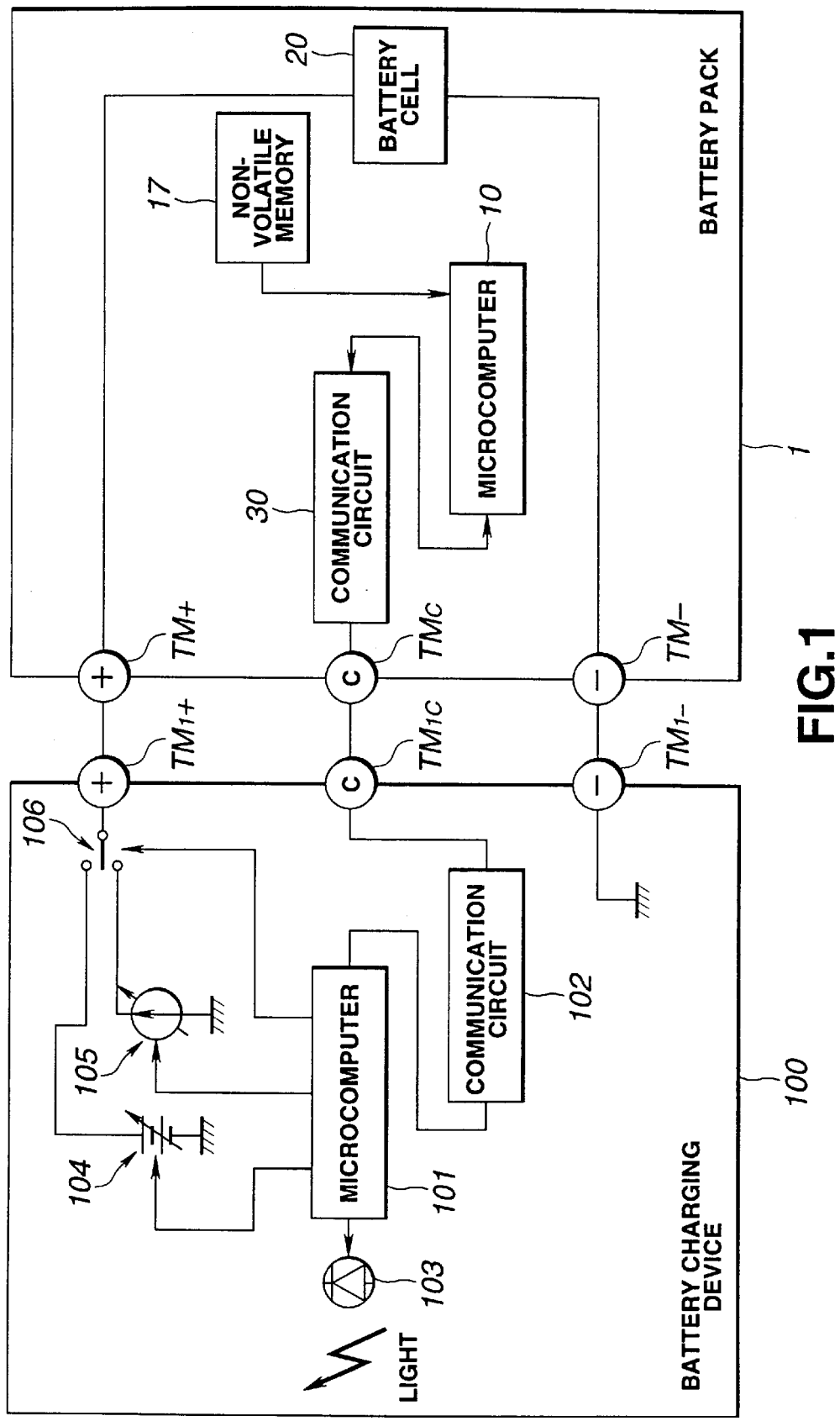
FIG. 1 is a block diagram showing a circuit arrangement of a battery charging device according to the present invention.

Referring to FIG. 1, there is schematically shown a system including a battery charging device 100 and a battery pack 1.

In FIG. 1, the battery charging device 100 includes a communication circuit 102 for conducting data communication with the afore-mentioned battery pack 1, a light-emitting element 103 such as a light-emitting diode, a variable voltage source 104, a variable current source 105, a change-over switch 106 for switching between an output voltage from the afore-mentioned variable voltage source 104 and an output current from the afore-mentioned variable current source 105, and a microcomputer 101. The microcomputer 101 can control the turning-ON and OFF of the afore-mentioned light-emitting diode 103, the switching of the afore-mentioned change-over switch 106, and a value of the output voltage from the afore-mentioned variable voltage source 104 and a value of the output current from the afore-mentioned variable current source 105.

Further, the battery pack 1 includes a battery cell 20 constituted by, for example, a lithium-ion battery, a non-volatile memory 17 for storing at least an information indicative of the maximum charging current of the battery cell 20 and an information indicative of the maximum charging voltage of the battery cell 20, a communication circuit 30 for performing data communications with the battery charging device 100, and a microcomputer 10. The microcomputer 10 reads out the information indicative of the maximum charging current and the information indicative of the maximum charging voltage both stored in the non-volatile memory 17, and transmits the information to the battery charging device 100 through the afore-mentioned communication circuit 30. In addition, the microcomputer 10 is able not only to recognize various conditions of the battery cell 20 such as voltage, current or the like upon charging in such a manner as described hereinafter, but also to transmit the information obtained by the recognition to the battery charging device 100.

A positive terminal $TM_+$ of the battery pack 1 is coupled with a positive terminal $TM_{1+}$ of the battery charging device 100. Whereas, a negative terminal $TM_-$ of the battery pack 1 is coupled with a negative terminal $TM_{1-}$ of the battery charging device 100. The battery pack 1 is charged by the battery charging device 100 through these positive and negative terminals. Further, a control terminal $TM_C$ of the battery pack 1 is coupled with a control terminal $TM_{1C}$ of the battery charging device 100, such that the information indicative of the maximum charging current and the information indicative of the maximum charging voltage, the information for the current or voltage of the battery cell 20 upon charging, or other information can be communicated, i.e., received and transmitted, between the battery pack 1 and the battery charging device 100.

In this case, as the battery pack 1, there can be used a plurality of battery packs which are different in charging voltage (a maximum applicable charging voltage) per one battery pack and in charging current (a maximum flowable charging current) per one battery pack, from each other depending upon kinds of electrodes used in the respective battery cells 20.

In the following descriptions, a battery pack having a maximum charging voltage per one battery pack of 4.2 V and a maximum charging current per one battery pack of 4 A and another battery pack having a maximum charging voltage per one battery pack of 4.1 V and a maximum charging current per one battery pack of 2 A are used as examples of the battery packs.

Thus, since there exist plural kinds of battery packs 1, it is required that at least the information indicative of the maximum charging current and the information indicative of the maximum charging voltage are stored in the afore-mentioned non-volatile memory 17 of each battery pack 1. In this case, the information indicative of the maximum charging voltage is constituted by 8 bits where a current per one bit corresponds to 0.1 A, and the information indicative of the maximum charging voltage is constituted by 16 bits where a voltage per one bit corresponds to 0.01 V. Incidentally, the reason why 0.01 V is assigned for one bit is that the difference in maximum charging voltage per one battery cell between the respective battery packs are as small as between 4.2 V and 4.1 V, and especially in the case of the lithium-ion battery, it is important not to exceed the maximum charging voltage upon charging from the standpoint of safety.

Figure 2:
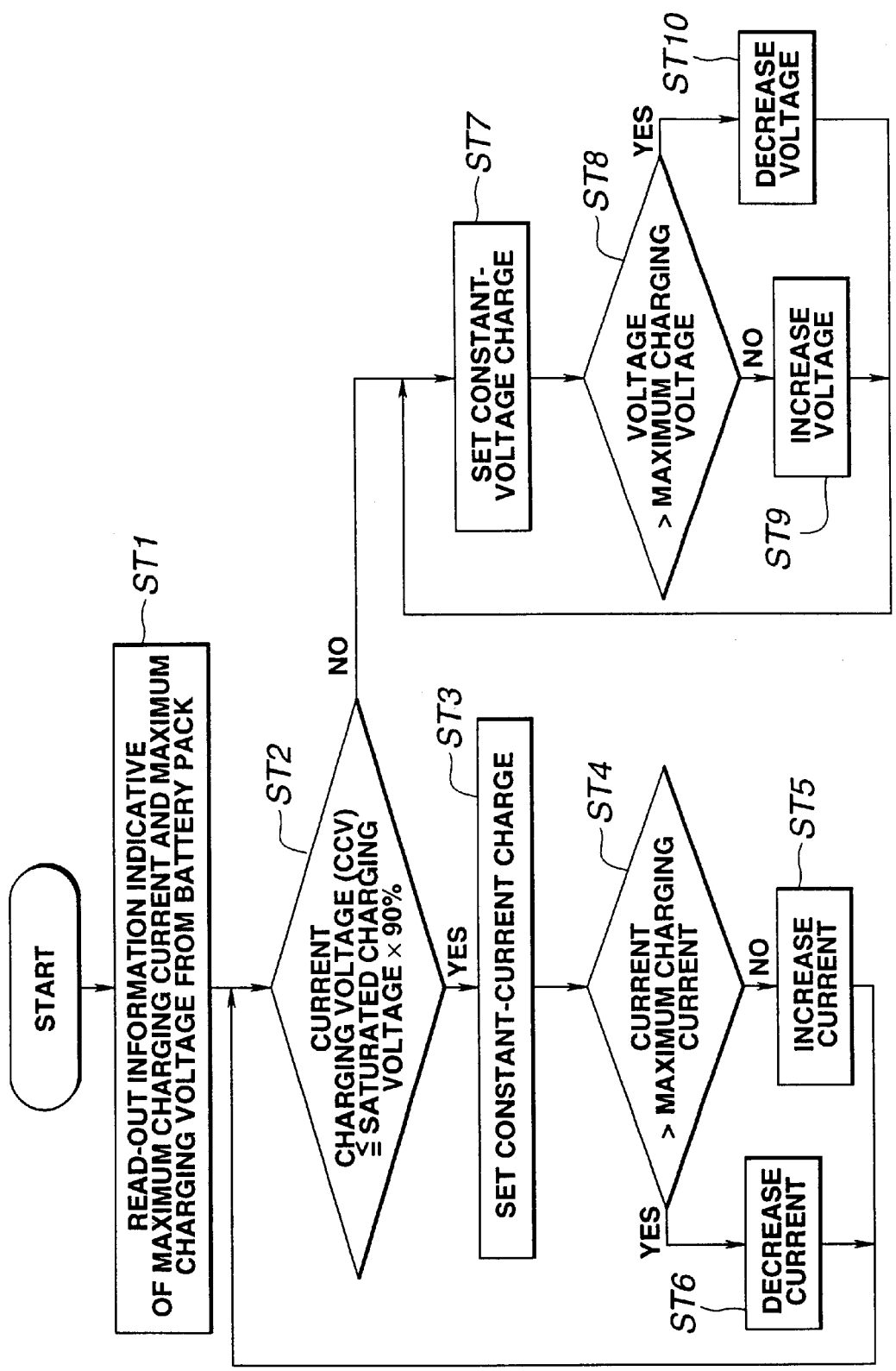
FIG. 2 is a flow chart showing operations of a microcomputer incorporated in the battery charging device when the device is used to charge a battery pack.

In the following, there is described the charging operation in which the battery pack 1 is charged by the battery charging device 100, by referring to the flow chart as shown in FIG. 2.

First, at the step ST1, the microcomputer 101 of the battery charging device 100 requests the microcomputer 10 of the battery pack 1 to transmit thereto the information indicative of the maximum charging voltage and the information indicative of the maximum charging current both stored in the non-volatile memory 17. When the information transmitted from the battery pack 1 based on the request is received, the microcomputer 101 of the battery charging device 100 can recognize the maximum charging current permitted to flow through the battery cell 20 upon charging and the maximum charging voltage permitted to be applied to the battery cell 20 upon charging. In addition, when the charging operation starts, the microcomputer 10 of the battery pack 1 recognizes values of currently-charged voltage (current charging voltage: CCV) and currently-flowing current of the battery cell 20 as described hereinafter, and transmits to the microcomputer 101 of the battery charging device 100 the information indicative of the currently-charged voltage and currently-flowing current of the battery cell 20, thereby causing the microcomputer 101 of the battery charging 100 to recognize these voltage and current values.

Next, at the step ST2, the microcomputer 101 of the battery charging device 100 determines a saturated charging voltage of the battery cell 20 based on the information indicative of the maximum charging voltage of the battery pack 1, and calculates a voltage value which corresponds to 90% of the saturated charging voltage. Further, the microcomputer 101 compares the current charging voltage of the battery cell 20 transmitted from the battery pack 1 with the calculated voltage value corresponding 90% of the saturated charging voltage thereof. When it is recognized that the current charging voltage is smaller than 90% of the saturated charging voltage, the charging program proceeds to the step ST3 where the charging of the battery pack 1 is performed in the condition of constant-current charge. On the other hand, when it is recognized that the current charging voltage is greater than 90% of the saturated charging voltage, the charging program proceeds to the step ST7 where the battery pack 1 is charged in the condition of constant-voltage charge. More specifically, when the constant-current charge is performed at the step ST3, the microcomputer 101 of the battery charging device 100 changes over the change-over switch 106 to establish the connection between the battery pack 1 and the variable current source 105, and sets a current output from the variable current source 105 to a value corresponding to the afore-mentioned maximum charging current, thereby permitting the battery pack 1 to be charged at the set value of the current supplied from the variable current source. However, at this time, it should be noted that the charging voltage of the battery pack 1 does not exceed the maximum charging voltage. On the other hand, when the constant-voltage charge is performed at the step ST7, the microcomputer 101 of the battery charging device 100 changes over the change-over switch 106 to establish the connection between the battery pack 1 and the variable voltage source 104, and sets a voltage output from the variable voltage source 104 to a value corresponding to the afore-mentioned maximum charging voltage, thereby permitting the battery pack 1 to be charged at the set value of the voltage applied by the variable voltage source. However, at this time, it should also be noted that the charging current flowed through the battery pack 1 does not exceed the maximum charging current.

When the constant current charge is performed at the step ST3, the microcomputer 101 compares the maximum charging current of battery pack 1 with the currently-flowing current of the battery cell 20, as shown in step ST4. When it is recognized that the currently-flowing current is smaller than the maximum charging current, the program proceeds to the step ST5 where the current supplied to the battery pack 1 is increased. On the other hand, when it is recognized that the currently-flowing current is greater than the maximum charging current, the program proceeds to the step ST6 where the current supplied to the battery pack 1 is decreased. More specifically, when the current supplied to the battery pack 1 is increased at the step ST5, the microcomputer 101 of the battery charging device 100 controls the variable current source 105 to increase a value of the current output therefrom. On the other hand, when the current supplied to the battery pack 1 is increased at the step ST6, the microcomputer 101 of the battery charging device 100 controls the variable current source 105 to decrease the value of the current output therefrom.

After the control of the step ST5 or the step ST6 is completed, the program for the microcomputer 101 of the battery charging device 100 returns to the decision block of the step ST2.

On the other hand, if it is determined in the step ST2 that the current charging voltage of the battery pack 1 exceeds 90% of the saturated charging voltage so that the constant-voltage charge is to be performed at step ST7, the microcomputer 101 of the battery charging device 100 compares the value of the afore-mentioned maximum charging voltage of the battery pack 1 with the value of the current charging voltage of the battery cell 20 transmitted from the battery pack 1, as shown by the step ST8. If it is determined at the step ST8 that the value of the current charging voltage is smaller than the maximum charging voltage, the voltage applied to the battery pack 1 is intended to be increased by the microcomputer 101 of the battery charging device 100, as shown in the step ST9. On the other hand, If it is determined at the step ST8 that the value of the current charging voltage is greater than the maximum charging voltage, the voltage applied to the battery pack 1 is intended to be decreased by the microcomputer 101 of the battery charging device 100, as shown in the step ST10. More specifically, when the voltage applied to the battery pack 1 is intended to be increased as in the step ST9, the microcomputer 101 of the battery charging device 100 controls the variable voltage source 104 so as to increase a value of the voltage output therefrom. On the other hand, when the voltage applied to the battery pack 1 is intended to be decreased as in the step ST10, the microcomputer 101 of the battery charging device 100 controls the variable voltage source 104 so as to decrease a value of the voltage output therefrom.

After the control of the step ST9 or the step ST10 is completed, the program for the microcomputer 101 of the battery charging device 100 returns to the execution block of the constant-voltage charge as indicated by the step ST7.

In the meantime, during the time in which it is determined at the step ST2 that the current charging voltage is smaller than 90% of the saturated charging voltage and therefore the battery pack 1 is charged in the condition of constant-current charge as in the step ST3 and subsequent steps, the microcomputer 101 of the battery charging device 100 controls the light-emitting diode 103 shown in FIG. 1 so as to keep the diode turned ON. On the other hand, when it is determined at the step ST2 that the current charging voltage is greater than 90% of the saturated charging voltage and therefore the battery pack 1 is charged in the condition of constant-voltage charge as in the steps ST7 and subsequent steps, the microcomputer 101 of the battery charging device 100 controls the light-emitting diode 103 shown in FIG. 1 so as to keep the diode turned OFF. As a matter of course, the ON and OFF conditions of the light-emitting diode 103 may be set reversely. By the provision of the light-emitting diode, it is possible for user to recognize the condition that the battery pack 1 is charged up to 90% or more of the saturated charging voltage.

The microcomputer 101 of the battery charging device 100 performs the charging operation only during such a period in which the battery pack 1 is mounted thereto, and terminates the charging operation when the battery pack 1 is dismounted therefrom. The detection of mounting or dismounting of the battery pack 1 can be realized, for example, by providing a sensor for detecting the mounting and dismounting on the battery charging device 100 and continuously monitoring the output of the sensor. Alternatively, the detection of the mounting or dismounting of the battery pack 1 can be determined by detecting interruption of the communication between the battery pack 1 and the microcomputer 10.

Figure 3:
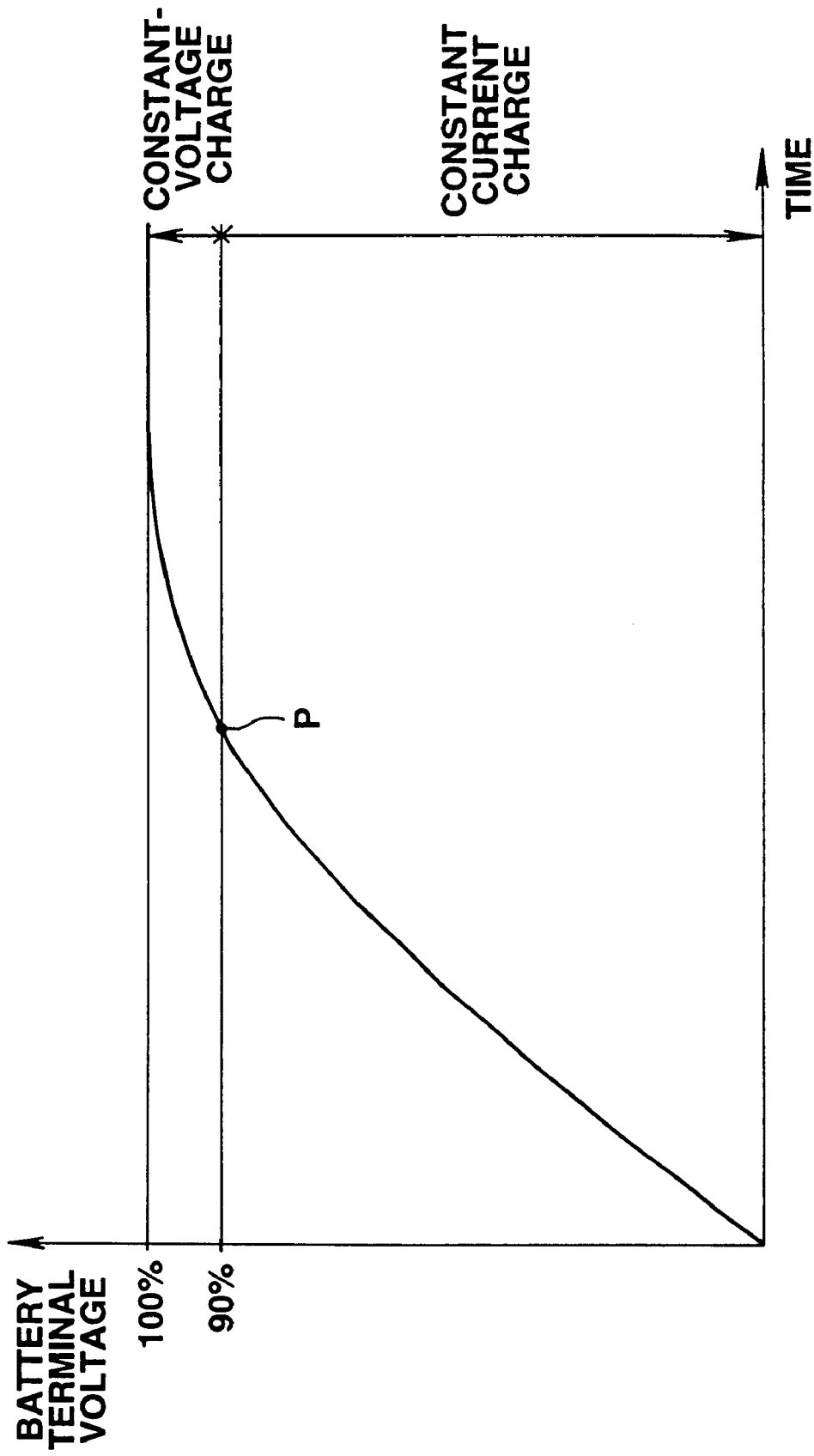
FIG. 3 is a view explaining changing-over operation between constant-current charge and constant-voltage charge.

As described above, in the battery charging device 100 according to the present invention, the information indicative of the afore-mentioned maximum charging current and the information indicative of the maximum charging voltage stored in the non-volatile memory 17 of the battery pack 1 is read out and the currently-charged voltage and the currently-flowing current of the battery pack 1 are also monitored continuously. Further, as shown in FIG. 3, the battery pack 1 is charged in the condition of constant-current charge in an initial stage of the charging operation. After the current charging voltage of the battery pack 1 reaches a predetermined voltage (corresponding to 90% of the saturated charging voltage as indicated by the point P in FIG. 3), the condition is changed from the constant-current charge to the constant-voltage charge using the maximum charging voltage. By such an arrangement of the battery charging device 100 according to the present invention, it becomes possible to supply an optimum charging energy to all of the battery packs to enable them to be charged up to 100%, and to reduce the time required for achieving the 100% charging condition of the battery packs. In general, for example, in the case where two kinds of battery packs one of which has a maximum charging voltage per one battery cell of 4.2 V and a maximum charging current of 2 A and the other of which has a maximum charging voltage per one battery cell of 4.1 V and a maximum charging current of 4 A are charged as described above, the one battery pack having a maximum charging current of 4A requires a charging current two times that for the other battery pack having a maximum charging current of 2 A. Accordingly, the former battery pack having a maximum charging current of 4A requires a charging time two times that for the latter battery pack having a maximum charging current of 2 A. However, in accordance with the battery charging device 100 according to the present invention, the battery pack having the maximum charging current of 4 A can be supplied with a larger amount of current in the initial stage of the charging operation, so that it is possible to reduce the charging time required therefor. Also, even though the battery packs have different maximum charging voltages from each other (i.e., one is 4.1 V and the other is 4.2 V), since the charging condition of each battery pack is changed over to the constant-voltage charge when the current charging voltage thereof reaches 90% or more of the saturated charging voltage, the battery pack can be charged up to 100% depending upon the maximum charging voltage thereof.

In the afore-mentioned embodiment, the non-volatile memory 17 of the battery pack 1 can store only the information indicative of the maximum charging voltage and the information indicative of the maximum charging current. In addition to the afore-mentioned information, the non-volatile memory 17 can store the other information indicative of connecting conditions of the battery cell 20, for example, the number of series connections or, if required, the number of parallel connections or the like. For instance, if the information indicative of the number of series connections is stored in the non-volatile memory 17, the battery charging device 100 according to the present invention can also be used to charge various kinds of battery packs I having battery cells which are different in number of series connection from each other in an optimum manner.

Figure 4:
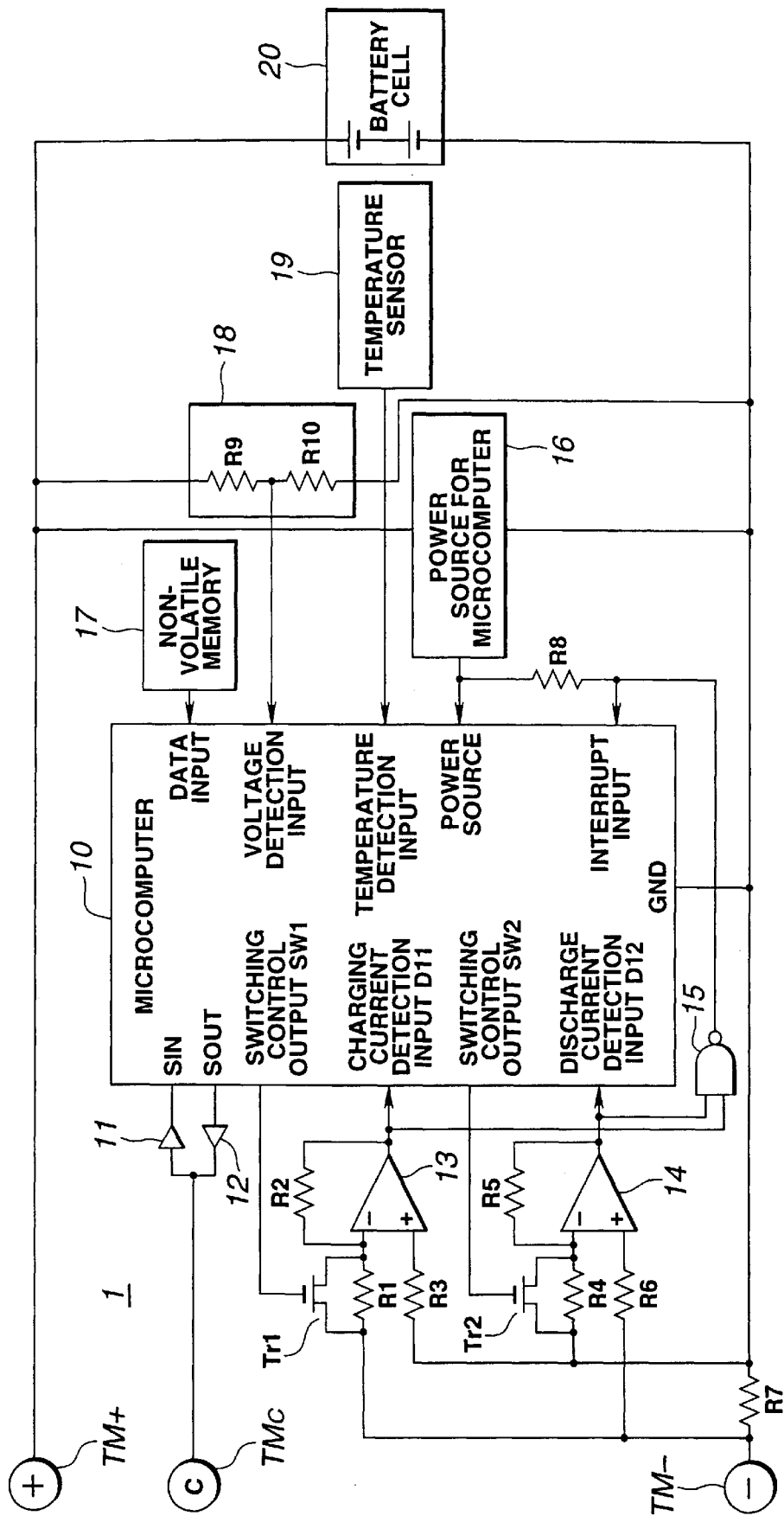
FIG. 4 is a block diagram showing a specific circuit arrangement of the battery pack according to the present invention.

Next, a specific arrangement of the battery pack 1 according to the present invention is described by referring to FIG. 4.

In the battery pack shown in FIG. 4, the positive electrode of the battery cell 20 is coupled to the positive terminal $TM_+$ of the battery pack 1 and the negative electrode of the battery cell 20 is coupled to the negative terminal $TM_-$ of the battery pack 1 through a current/voltage detection resistance R7.

The microcomputer 10 incorporated in the battery pack 1 is coupled with a power source 16 for microcomputer including series regulators, reset circuits or the like, and operated by the power supplied from the power source 16. The charging current detection input terminal DI1 of the microcomputer 10 is coupled to an output terminal of an operational amplifier 13, which serves for detecting the charging current. The discharge current detection input terminal DI2 is coupled to an output terminal of the operational amplifier 13, which serves for detecting the discharge current. In addition, the interrupt input terminal of the microcomputer 10 is coupled to an output terminal of a NAND gate 15 whose two input terminals are coupled to output terminals of operational amplifiers 13 and 14. The output terminal of the NAND gate 15 is also coupled to the power source 16 for microcomputer through a pull-up resistance R8. Besides, the temperature detection input terminal of the microcomputer 10 is coupled to an output terminal of a temperature sensor 19 for detecting an ambient temperature of the battery cell 20. The voltage detection input terminal of the microcomputer 10 is coupled to an output terminal of a voltage detection circuit 18 for detecting a terminal voltage of the battery cell 20. The data input terminal of the microcomputer 10 is coupled to an output terminal of the afore-mentioned non-volatile memory 17. The ground terminal GND of the microcomputer 10 is coupled to a negative electrode of the battery cell 20. The communication input and output terminal (SIN and SOUT terminals) of the microcomputer 10 are coupled to buffer amplifiers 11 and 12, respectively, which constitute a part of the afore-mentioned communication circuit 30. Incidentally, the afore-mentioned charging current input terminal DI1, discharge current input terminal DI2, temperature detection input terminal, voltage detection input terminal and the like are analog input terminals and therefore all are constituted by A/D input ports. Accordingly, the microcomputer 10 incorporates therein an A/D converter for converting these analog inputs into digital data.

The non-inversion input terminal of the operational amplifier 13 is coupled to the negative electrode of the battery cell 20 through a resistance R3. The inversion input terminal of the operational amplifier 13 is coupled to a negative-feedback resistance R2 for setting an amplification factor and a resistance Rl. Accordingly, the voltage from the output terminal of the operational amplifier 13 is equal to a voltage value amplified by multiplying a value of the current flowing through the battery pack 1 (current flowing upon charging) by a ratio of a resistance value of the resistance R2 to that of the resistance R1 (R2/R1). On the other hand, the non-inversion input terminal of the operational amplifier 14 is coupled to the negative electrode of the battery cell 20 through a resistance R6 and a resistance R7 which serves for detecting current and voltage. The inversion input terminal of the operational amplifier 14 is coupled to a negative-feedback resistance R5 and a resistance R4. Accordingly, the voltage from the output terminal of the operational amplifier 14 is equal to a voltage value amplified by multiplying a value of the current flowing through the battery pack 1 (current flowing upon discharge) by a ratio of a resistance value of the resistance R5 to that of the resistance R4 (R5/R4).

Further, a transistor switch Trl is constituted by, for example, a field effect transistor whose gate is coupled to a switching control output terminal SW1 of the microcomputer 10 and between whose drain and source the afore-mentioned resistance R1 is connected. Accordingly, when the level of signal from the switching control output terminal SW1 of the microcomputer 10 is, for example, HIGH (H), the field effect transistor Tr1 is turned ON so that the value of the resistance R1 becomes approximately zero (namely, only an internal resistance of the field effect transistor Tr1), and the amplification factor (amplifier gain) of the operational amplifier 13, whose amplification factor is determined according to the ratio of the value of the resistance R2 to that of the resistance R1 (R2/R1) becomes large. On the other hand, when the level of signal from the switching control output terminal SW1 of the microcomputer 10 is, for example, LOW (L), the transistor switch Tr1 is turned OFF so that the amplification factor (amplifier gain) of the operational amplifier 13 is smaller than the amplification factor determined according to the ratio of the value of the resistance R2 to that of the resistance R1 (R2/R1), i.e., the amplification factor obtained in the case where the transistor switch Tr1 is turned ON. Similarly, a transistor switch Tr2 is constituted by, for example, a field effect transistor whose gain is coupled to the switching control output terminal SW2 of the microcomputer 10 and between whose drain and source the afore-mentioned resistance R4 is connected. Accordingly, when the level of signal from the switching control output terminal SW2 of the microcomputer 10 is, for example, HIGH (H), the transistor switch Tr1 is turned ON so that the value of the resistance R4 becomes approximately zero (namely, only an internal resistance of the transistor switch Tr2), and the amplification factor (amplifier gain) of the operational amplifier 13 becomes large. On the other hand, when the level of signal from the switching control output terminal SW2 of the microcomputer 10 is, for example, LOW (L), the transistor switch Tr2 is turned OFF so that the amplification factor (amplifier gain) of the operational amplifier 14 becomes small.

In this case, in a normal operational mode (upon running), the microcomputer 10 continuously monitors the signal levels of the afore-mentioned charging current detection input terminal DI1 and discharge current detection input terminal DI2. If these levels reaches or exceeds predetermined values, the levels of signals from the afore-mentioned switching control output terminals SW1 and SW2 are both set to LOW (L) level, so that the transistor switches Tr1 and Tr2 are both turned OFF, and the amplifier gains of the operational amplifiers 13 and 14 becomes small. Accordingly, the microcomputer 10 can measure a value of the current flowing within the battery pack 1 (current flowing upon charging or discharging) by using the values of outputs from the operational amplifiers 13 and 14 having the low amplifier gain. For this reason, the microcomputer 10 can recognize the value of the current flowing upon charging or discharging so that integrated value of charging and discharging currents and the like can be calculated.

On the other hand, in the normal operational mode (upon running), when the charging and discharging currents flowing within the battery pack 1 are decreased to an extremely small value not more than the predetermined value, the output value from the operational amplifiers 13 and 14, which amplifier gains are both rendered small, also becomes small. That is, the levels of the afore-mentioned charging current detection input terminal DI1 and discharge current detection input terminal DI2 also becomes small. At this time, in the microcomputer 10, the levels of the afore-mentioned terminals DI1 and DI2 are decreased to lower than the predetermined level. If such a condition is continued for a predetermined period of time, the microcomputer 10 determines that the circuitry is in a no-load condition, so that the operational mode thereof is transferred into a power-saving mode (sleep mode). Upon the power-saving mode, the circuitry is operated with a lower power consumption than in the afore-mentioned normal operational mode, so that energy-saving operation thereof becomes possible.

When the microcomputer 10 is operated in the power-saving mode (sleep mode), the levels of signals from the afore-mentioned switching control output terminals SW1 and SW2 are both HIGH levels. This causes the transistor switches Tr1 and Tr2 to be turned ON, so that the amplifier gains of the operational amplifiers 13 and 14 become large. Accordingly, when the circuitry is operated in the power-saving mode (sleep mode), the microcomputer 10 can measure the extremely small current flowing within the battery pack 1 (extremely small current flowing upon charging or extremely small current flowing upon discharge) by using output values of the operational amplifiers 13 and 14 whose amplifier gains are rendered small.

In this case, under such a power-saving operational mode, when the charging or discharging currents reach or exceed the afore-mentioned predetermined value, the output values of the operational amplifiers 13 and 14 both become large. That is, the levels of the two input terminals of the afore-mentioned NAND gate 15 are both HIGH levels. Accordingly, the output of the NAND gate 15 becomes a LOW level. Thus, when the output level of the NAND gate 15 coupled to the interrupt input terminal becomes a LOW level, the microcomputer 10 cancels the afore-mentioned power-saving operational mode so that the operational mode of the circuitry is transferred from the power-saving operational mode to the normal operational mode.

As described above, in the circuitry arrangement illustrated in FIG. 4, since the circuitry is operated with a lower power consumption in the power-saving mode of operation than that in the normal operational mode, considerable power saving can be achieved. In addition, in the circuitry arrangement illustrated in FIG. 4, the microcomputer 10 can perform the ON/OFF control of the transistor switches Tr1 and Tr2 by means of the switching control outputs SW1 and SW2, so that the amplifier gains of the operational amplifiers 13 and 14 can be changed over. The afore-mentioned arrangement makes it possible both to detect an extremely small current in the power-saving operational mode and to measure the value of current in the normal operational mode.

The voltage detection circuit 18 is a voltage-dividing resistor constituted by resistances R9 and R10. By using the voltage-dividing resistor, the terminal voltage of the battery cell 20 can be detected. The voltage value detected by the voltage detection circuit 18 is supplied to the afore-mentioned voltage detection input terminal of the microcomputer 10. Accordingly, based on the detected voltage value supplied from the voltage detection circuit 10 and received by the voltage detection input terminal of the microcomputer 10, it is possible to recognize the terminal voltage of the battery cell 20.

In addition, the temperature sensor 19 is constituted by, for example, a thermistor for detecting a temperature, or the like, and disposed in close proximity to the battery cell 20. The temperature value detected by the temperature sensor 18 is supplied to the temperature detection input terminal of the microcomputer 10. Accordingly, the microcomputer 10 can recognize the temperature of the battery cell 20 based on the detected temperature value supplied to the temperature detection input terminal thereof.

Further, the afore-mentioned non-volatile memory 17 is constituted by, for example, EEP-ROM, and can also store therein data (cycle data) indicative of number of permissible maximum charging and discharging cycles of the battery cell 20 in addition to the information indicative of the maximum charging voltage or the maximum charging current and the information indicative of the connecting conditions as mentioned above. If such data indicative of the number of maximum permissible charging and discharging cycles of the battery cell 20 are stored in the non-volatile memory 17, the microcomputer 10 can transmit a flag indicative of reaching the maximum permissible charging and discharging cycles to electronic equipment to which the battery pack 1 is mounted, by reading out the data indicative of the number of the maximum permissible charging and discharging cycles from the non-volatile memory 17 and simultaneously measuring current charging and discharging cycles of the battery cell 20. Accordingly, when the flag transmitted from the battery pack 1 is received by the electronic equipment, it is possible to provide, for example, an indication for directing the user's attention to necessity of replacement of the battery pack, an indication of a residual capacity of the battery pack, or the like.

Next, there is explained the calculation of residual battery capacity operated by the afore-mentioned microcomputer 10, that is, the integrating operation of charging and discharging currents based on the output values of the afore-mentioned operational amplifiers 13 and 14. Incidentally, in these operations, the operational amplifiers 13 and 14 are used as a charging current detection amplifier or a discharging current detection amplifier in the current detection circuitry.

The current detection circuitry detects a charging or discharging current i [mA] flowing through the resistance R7 and amplifies the detected current by a given gain G [V/mA] inclusive of that of current/voltage conversion, so as to output a voltage e=iG [V] which is then supplied to the charging current detection input terminal DI1 and the discharge current detection input terminal DI2 as A/D ports of the microcomputer 10. In the A/D converting means (A/D converter) of the microcomputer 10, the input voltage e [V] is quantized with a given quantization width or step q [V/LSB] to convert the analog data into a digital value x=e/q (=iG/q). Based on the digital value x, the microcomputer 10 performs the calculation every predetermined operation period T [h: hour].

Assuming that the current i continuously flows for the operation period T, the increment or decrement $\Delta Y$ is given by the formula of $\Delta Y = iT = (xq/G)$ [mAh]. The increment or decrement $\Delta Y$ is represented by the following formula, using the digital data x obtained by the afore-mentioned A/D conversion.

$$\Delta Y = (qT/G)x$$

When the respective values q, T and G in the above formula are adjusted such that the multiplication coefficient qT/G is equal to $2^n$, the above formula is rewritten as $\Delta Y = (2^n)x$. As a result, the value can be readily calculated by bit shift.

Meanwhile, a positive (+) value of the current i corresponds to charging operations while a negative value (−) of the current i corresponds to discharging operations. In the afore-mentioned embodiment as shown in FIG. 4, among the charging and discharging currents flowing through the resistance R7, the charging current is detected by the operational amplifier 13 while the discharging current is detected by the operational amplifier 14. The respective detected charging and discharging currents are output as a positive voltage and supplied to the charging current detection input terminal DI1 and the discharge current detection input terminal DI2. Accordingly, assuming that a voltage $e_1$ is supplied from the operational amplifier 13 to the charging current detection input terminal DI1 of the microcomputer 10 based on a detected charging currents $i_1$ and the voltage $e_1$ is subjected to analog-to-digital conversion by the A/D converter within the microcomputer 10 to obtain a digital value $x_1$, and that a voltages $e_2$ is supplied from the operational amplifier 14 to the discharging current detection input terminals DI2 of the microcomputer 10 based on a detected charging current $i_2$ and the voltage $e_2$ is subjected to analog-to-digital conversion by the A/D converter within the microcomputer 10 to obtain a digital value $x_2$, the increment or decrement $\Delta Y$ [mAh] of the residual battery capacity Y [mAh] every operational period T can be given by the following formula:

$$\Delta Y = (i_1 - i_2) \times T$$
$$= (e_1 - e_2) \times T/G$$
$$= (x_1 - x_2) \times qT/G$$

If the multiplication coefficient is set as $qT/G = 2^n$, the above formula is given by:

$$\Delta Y = (x_1 - x_2) \times 2^n$$

As a result, the value can be readily calculated by bit shift.

Figure 5:
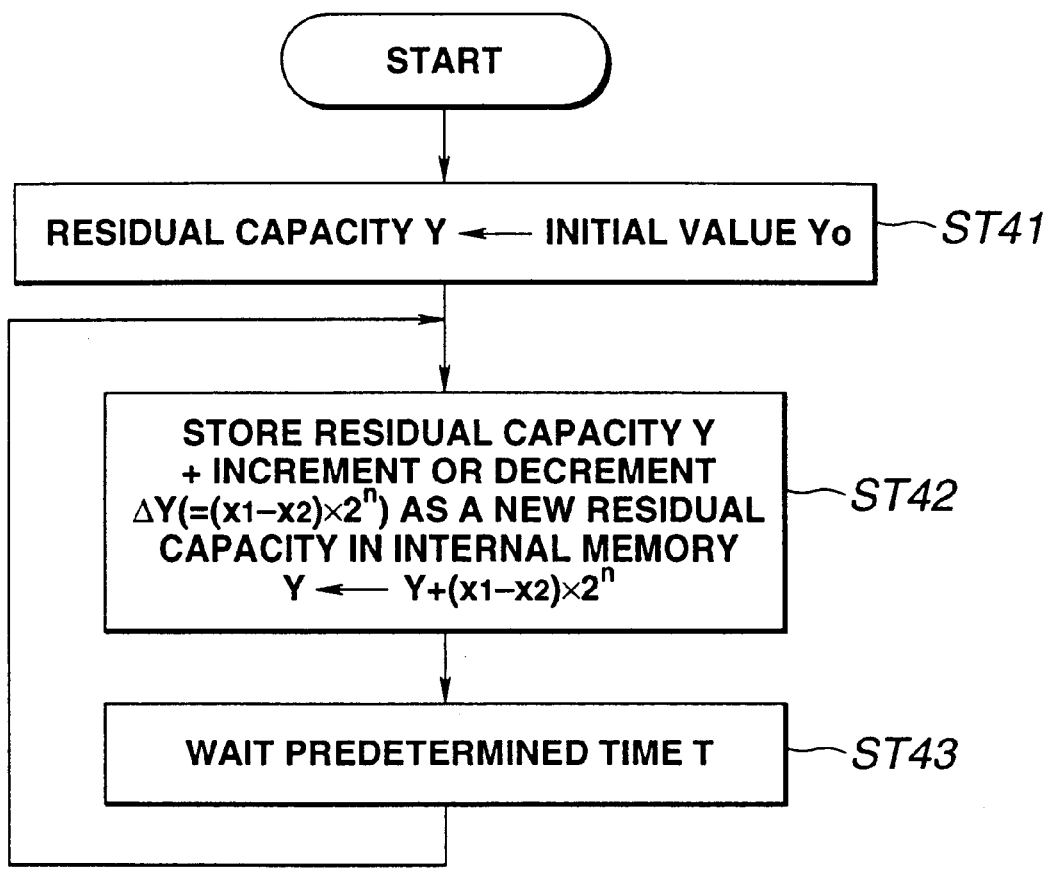
FIG. 5 is a flow chart showing a sequence of integrating processing for computing charging and discharging currents in the battery pack according to the present invention.

FIG. 5 is a flow chart showing a computing operation of the microcomputer 10 for calculating the residual battery capacity by the integrating operation of the afore-mentioned charging and discharging current values.

In FIG. 5, at the step ST41, a residual battery capacity data Y [mAh] is set as an initial residual capacity $Y_0$ [mAh]. This procedure is represented by $Y \leftarrow Y_0$. At the next step ST42, the increment or decrement $\Delta Y$, that is, $(x_1-x_2) \times 2^n$, is added to the residual battery data Y [mAh] obtained immediately before the initiation of the step. The thus-obtained added value is stored as a new residual battery capacity data Y [mAh] in an internal memory (not shown) of the microcomputer 10. This procedure is represented by $Y \leftarrow [Y+(x_1-x_2) \times 2^n]$. In the further step ST43, the computing program returns to the step ST41 after waiting for a predetermined period of time T corresponding to the afore-mentioned operational period.

In this case, when the gain [V/mA] inclusive of that of current/voltage conversion in the current detection circuitry, the quantized step q [V/LSB] upon analog-to-digital conversion in the microcomputer 10, and the period for the integrating operation of the charging and discharging current values by the microcomputer 10 are selected such that the relationship therebetween is represented by $qT/G = 2^n$, the integrated current values or the residual battery capacity values can be obtained by bit shift without multiplying the coefficient.

The amplifier gain of the operational amplifier 13 constituting the current detection circuitry is determined by the ratio of R2/R1 as described above, while the amplifier gain of the operational amplifier 14 is determined by the ratio of R5/R4 as described above. Further, the current/voltage conversion ratio is determined by the resistance R7. The amplifier gain of the operational amplifier 13 for detecting a charging current and the amplifier gain of the operational amplifier 14 for detecting a discharge current may be same or different. The quantization step q of the analog-to-digital conversion of the microcomputer 10 is fixed by the IC in many cases. In addition, the operation period T can be varied according to software used.

More specifically, for example, assuming that relationships of $q/G = 2^k$ [mA/LSB] and T [h]=$\frac{1}{2}^m$ [h] (where k and m represent integers) are established, the increment or decrement $\Delta Y$ every operation period T is given by the formula:

$$\Delta Y = (x_1 - x_2) \times qT/G$$

$$= (x_1 - x_2) \times 2^{k-m}$$

Accordingly, the residual battery capacity Y [mAh] every operation period T can be renewed by the formula:

$$Y \leftarrow [Y + (x_1 - x_2) \times 2^{k-m}]$$

As a result, the integrating current value can be obtained only by the addition and subtraction, and by (k−m) bit shift operations.

Figure 6A:
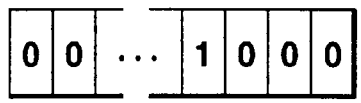
FIG. 6 is a view explaining the case where the gain G of the current detection circuitry is set so as to satisfy the relation of q/G=1 [mAh/LSB] in the battery pack according to the present invention.
Figure 6B:
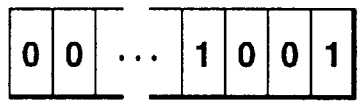
Figure 6C:
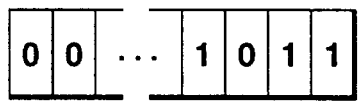

Specifically, in FIG. 6, there is shown the case where the gain G of the afore-mentioned current detection circuitry is set, for example, such that the relation of q/G=1 is established. Although the quantization step q is fixed in many cases, the value q may also be variable so as to obtain the relation of q/G=1. At this time, if an initial capacity is set to 8 mAh as shown in FIG. 6(A), the residual battery capacity Y is represented by 08H (where H is a hexadecimal numeral. That is, lower four bits are given by "1000".). In the case of the initial capacity of 08H, for example, when charging of 1 mA per hour is conducted for one hour, the A/D conversion data corresponding to input values of the charging current detection input terminal DI1 and the discharge current detection input terminal DI2 is given by 01H as it is. By adding this value to the initial capacity, a new residual batter capacity data Y of 9 mAh is obtained. Therefore, the residual battery capacity data Y is represented by 09H (that is, lower four bits are given by "1011".), as shown in FIG. 6(B). Successively, when charging of 2 mA per hour is conducted on the battery having the residual battery capacity of 09H for one hour, a new residual battery capacity data Y amounts to 11 mAh so that it is represented by 0BH (that is, lower four bits are given by "1011".), as shown in FIG. 6(C). As is understood from the above discussion, for example, if the gain G of the afore-mentioned current detection circuitry 80 or the like is set so as to establish the relation of q/G=1 [mAh/LSB], the integrating current value can be obtained without multiplication of the coefficient.

Figure 7A:
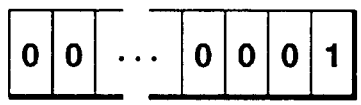
FIG. 7 is a view explaining the case where the gain G of the current detection circuitry and the like are set so as to satisfy the relation of q/G=8 (2) [mAh/LSB] in the battery pack according to the present invention.
Figure 7B:
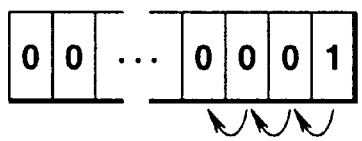
Figure 7C:
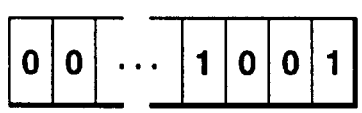

Similarly, as shown in FIGS. 7(A) to 7(C), in the case where the afore-mentioned gain and the like are set, e.g., to q/G=8 (=$2^3$) [mAh/LSB], when the initial capacity is, for example, 1 mAh as shown in FIG. 7(A), the residual battery capacity Y is represented by 01H (where H is a hexadecimal numeral, that is, lower four bits are given by "0001".). In the case of such an initial capacity of 01H, for example, when charging of 8 mA per hour is conducted for one hour, the A/D conversion data corresponding to input values of the charging current detection input terminal DI1 and the discharge current detection input terminal DI2 is given by 01H as shown in FIG. 7(B). When this data is added to the afore-mentioned residual battery capacity data Y, it is necessary to multiply the value by $2^3$. The multiplication of the data by $2^3$ can be achieved by rightward three bit shift operation, so that an increment of 08H, i.e., 8 mAh can be obtained. By adding this increment to the original residual battery capacity data, a new residual battery capacity data Y of 9 mAh is obtained as shown in FIG. 7(C). As is understood from the above discussion, if the gain G of the afore-mentioned current detection circuitry and the like are set, for example, so as to establish the relation of q/G=8 ($2^3$) [mAh/LSB], the integrated current value can be obtained without the multiplication of the coefficient though only the bit shift operation is required. In general, if the q/G is set to $2^n$ [mAh/LSB], the integrated current value or the residual battery capacity can be obtained by the n-time bit shift and the addition.

In the foregoing, there is described the embodiment using the lithium-ion battery as a battery cell. However, the present invention is also applicable to other secondary batteries such as nickel-cadmium batteries or nickel-hydrogen batteries in a similar manner.

Further, the battery pack according to the present invention can be mounted to various electronic apparatuses such as video cameras, portable telephones, personal computers or the like.

As described above, in accordance with the present invention, the information indicative of the maximum charging current and the information indicative of the maximum charging voltage are stored in the battery pack. Further, the battery pack is charged by the battery charging device in such a manner that constant-current charge is conducted at an initial stage of the charging and the charging mode is changed over to constant-voltage charge when the current charging voltage of the battery pack exceeds a predetermined value. Thus, by changing over the charging mode between the constant-current charge and the constant-voltage charge depending upon the current charging voltage of the battery pack and controlling so as not to exceed the maximum charging current and the maximum charging voltage, it is possible to supply an optimum charging energy to all of a plurality of battery packs which are different in maximum charging current and maximum charging voltage from each other.

What is claimed is:

1. A battery pack comprising:
   at least one battery cell;
   detection means electrically connected to said battery cell for detecting a charging or discharging current of said battery cell; and
   a control circuit electrically connected to said detection means for determining whether an operating mode of said battery cell is a normal operating mode or a power consumption mode in response to the charging or discharging current, wherein said detection means changes a detection gain in accordance with said normal operating mode and said power consumption mode.

2. The battery pack according to claim 1, wherein said control circuit includes a microcomputer.

3. The battery pack according to claim 1, wherein said detection means decreases said detection gain in said normal operating mode.

4. The battery pack according to claim 1, wherein said detection means increases said detection gain in said power consumption mode.

5. The battery pack according to claim 1, wherein said control circuit determines that the operating mode is the normal operating mode if said charging or discharging current is more than a predetermined value during the power consumption mode.

6. The battery pack according to claim 1, wherein said control circuit determines that the operating mode is the power consumption mode if said charging or discharging current is less than a predetermined value during the normal operating mode.

7. A method for controlling a battery pack including at least one battery cell and a control circuit which operates in normal operating mode or power consumption mode, said method comprising the steps of:
   detecting a charging or discharging current of said battery cell;
   determining whether an operating mode is the normal operating mode or the power consumption mode in response to the charging or discharging current; and changing a detection gain in accordance with said normal operating mode and said power consumption mode.

8. The method according to claim 7, wherein the detection gain is decreased in said normal operating mode.

9. The method according to claim 7, wherein the detection gain is increased in said power consumption mode.

10. The method according to claim 7, wherein the step of determining determines that the operating mode is the normal operating mode if said charging or discharging current is more than a predetermined value during the power consumption mode.

11. The method according to claim 7, wherein the step of determining determines that the operating mode is the power consumption mode if said charging or discharging current is less than a predetermined value during the normal operating mode.

12. A battery powered system comprising:

a battery powered device electrically connected to a battery cell for operating from said battery cell;

detection means electrically connected to said battery cell for detecting a discharging current of said battery cell;

a control circuit electrically connected to said detection means for determining whether an operating mode of said battery cell is a normal operating mode or a power consumption mode in response to the discharging current; and wherein said detection means changes a detection gain in accordance with said normal operating mode and said power consumption mode.

13. The battery powered system according to claim 12, wherein said control circuit includes a microcomputer.

14. The battery powered system according to claim 12, wherein said detection means decreases said detection gain in said normal operating mode.

15. The battery powered system according to claim 12, wherein said detection means increases said detection gain in said power consumption mode.

16. The battery powered system according to claim 12, wherein said control circuit determines that the operating mode is the normal operating mode if said discharging current is more than a predetermined value during the power consumption mode.

17. The battery powered system according to claim 12, wherein said control circuit determines that the operating mode is the power consumption mode if said discharging current is less than a predetermined value during the normal operating mode.

18. A battery charging system comprising:

a battery charging device electrically connected to a battery cell for charging said battery cell;

detection means electrically connected to said battery cell for detecting a charging current of said battery cell;

a control circuit electrically connected to said detection means for determining whether an operating mode of said battery cell is a normal operating mode or a power consumption mode in response to the charging current; and wherein said detection means changes a detection gain in accordance with said normal operating mode and said power consumption mode.

19. The battery charging system according to claim 18, wherein said control circuit includes a microcomputer.

20. The battery charging system according to claim 18, wherein said detection means decreases said detection gain in said normal operating mode.

21. The battery charging system according to claim 18, wherein said detection means increases said detection gain in said power consumption mode.

22. The battery charging system according to claim 18, wherein said control circuit determines that the operating mode is the normal operating mode if said charging current is more than a predetermined value during the power consumption mode.

23. The battery charging system according to claim 18, wherein said control circuit determines that the operating mode is the power consumption mode if said charging current is less than a predetermined value during the normal operating mode.

* * * * *